US009497646B2

(12) United States Patent
George et al.

(10) Patent No.: US 9,497,646 B2
(45) Date of Patent: Nov. 15, 2016

(54) PERFORMANCE EVALUATION OF SERVICES AND APPLICATIONS ON DEVICES IN LIVE WIRELESS ENVIRONMENTS

(71) Applicant: Airometric Wireless Inc., Redmond, WA (US)

(72) Inventors: Annie George, Redmond, WA (US); Mathew Samuel, Renton, WA (US)

(73) Assignee: AIROMETRIC WIRELESS INC., Redmond, WA (US)

(*) Notice: Subject to any disclaimer, the term of this patent is extended or adjusted under 35 U.S.C. 154(b) by 290 days.

(21) Appl. No.: 14/183,508

(22) Filed: Feb. 18, 2014

(65) Prior Publication Data

US 2014/0235179 A1     Aug. 21, 2014

Related U.S. Application Data

(60) Provisional application No. 61/766,037, filed on Feb. 18, 2013.

(51) Int. Cl.
*H04W 24/00* (2009.01)
*H04W 24/08* (2009.01)
(52) U.S. Cl.
CPC .................... *H04W 24/08* (2013.01)
(58) Field of Classification Search
CPC .... H04W 24/00; H04W 24/08; G01R 19/10; H04L 43/12; H04L 43/50; H04L 63/02; H06F 11/2294; H06F 44/244
See application file for complete search history.

(56) References Cited

U.S. PATENT DOCUMENTS

| | | | |
|---|---|---|---|
| 8,488,746 B1* | 7/2013 | Chang | H04L 43/0817 370/252 |
| 2006/0194553 A1* | 8/2006 | Ozaki | G01R 29/10 455/226.1 |
| 2006/0270400 A1* | 11/2006 | DaSilva | H04W 24/00 455/423 |
| 2007/0076228 A1* | 4/2007 | Apelbaum | G06Q 10/10 358/1.1 |
| 2012/0042213 A1* | 2/2012 | Zimmerman | H04L 43/12 714/46 |
| 2014/0168397 A1* | 6/2014 | Greco | H04N 7/181 348/77 |

* cited by examiner

*Primary Examiner* — Thanh Le
(74) *Attorney, Agent, or Firm* — AEON Law; Adam L.K. Philipp

(57) ABSTRACT

Services and applications running on devices placed in live wireless environments are tested and reported to determine the relative performance of the device under test. Multiple logs collected from the device under test are combined and transmitted to a remote backend system. The backend system stores and analyzes the combined logs to generate reports containing factual and relative performance information regarding the device during the testing period. The nature of the test, the collected log information, and the report format may all be modified according to the criteria of the requestor.

19 Claims, 24 Drawing Sheets

DEVICE INFORMATION TABLE

- DEVICE INFORMATION
  - DEVICE IMEI
  - PRODUCT SELECTION
  - NAME
  - OPERATING SYSTEM
  - FIRMWARE VERSION
  - HARDWARE VERSION
  - SOFTWARE VERSION
  - UA STRING

1700

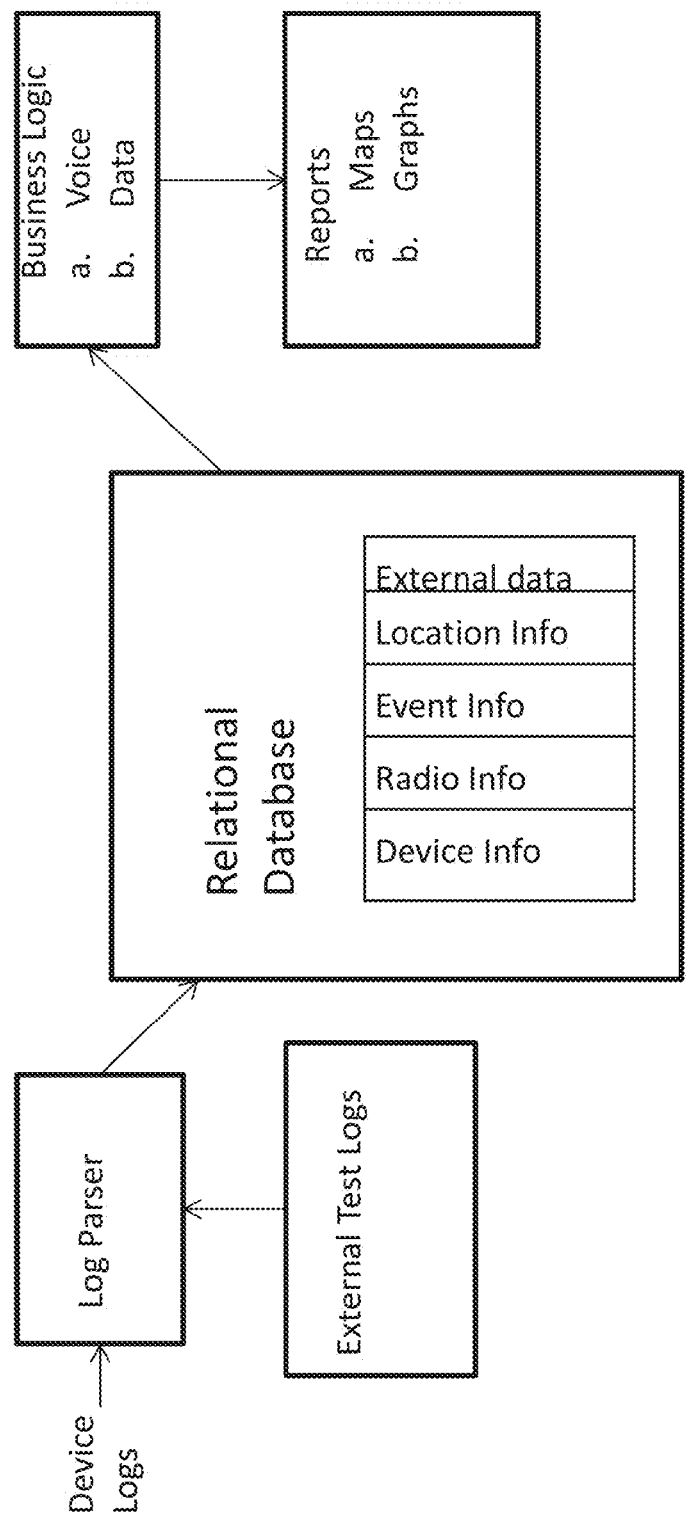

PERFORMANCE EVALUATION OF SERVICES AND APPLICATIONS ON DEVICES IN LIVE WIRELESS ENVIRONMENTS

TECHNICAL FIELD

The present invention is directed to evaluate and rate the end to end performance of wireless products including devices, networks and applications used by various wireless devices in an evolving wireless environment.
In particular, the invention utilizes a process that allows for collection of new combination of information pertaining to a telecom session thereby affording comprehensive analysis of customer experience.

BACKGROUND

Mobile networks are undergoing rapid changes with the deployment of new technologies. This fosters the introduction of many varieties of devices. Any data, voice or application utilizes resources on both the mobile device and the network. Hence it is important that adequate performance analysis of the device/network is done during and after the development of device, network and mobile applications. Current performance analysis tools for devices on a live network consists of manual tests or tests that only looks at the performance statistics from the highest level (application) on the device. Often these tests are done using a specially modified version of the device, which creates performance inconsistencies when compared to unmodified consumer devices

SUMMARY

In view of the problems in the state of the art, embodiments of the invention are based on the technical problem of performance evaluation of services and applications on devices in live wireless environments. To understand fully the various causes of a particular telecom event, it is necessary to look at the application layer, OS layer and the layers below the OS including the baseband and the communication layer. As will be shown and described below, embodiments of the invention collectively possess numerous benefits and advantages over existing procedures utilized to analyze the device under test. For example, some of these benefits and advantages include:
1. For a single test scenario, multiple logs and various information including context aware information (e.g., location, RF environment, network characteristics, policies, etc.,) from multiple layers in the device under test is collected individually, combined and analyzed using custom business logic.
2. End users can retrieve the results and reports from a web service and can correlate these results to historical data if available
3. The business logic used to analyze the data and create reports can be customized per user requirements
4. Consumers can use this tool to test their device or application performance in a real network to get performance metrics that reflect those of an actual consumer This invention can be deemed to be a Testing as a Service (TAAS) methodology as it allows for Mobile Operators, OEMs, OS manufacturers; commercial enterprises, m2m ecosystem and end consumers to utilize this system as a service. The analysis of the collected data utilizes unique methodologies that allow for the collected data to be pivoted for various types of customer needs. Because of its flexibility and simplicity in use, analysis and reporting, the customer is presented with the knowledge to help gain a reduction in risks associated with a particular device, network design or mobile application performance. The wireless environment can relate to cellular 3GPP/3GPP2 Radio Technologies like 2G (GSM/GPRS); 3G (UMTS/HSPA/CDMA); 4G (LTE/HSPA+) or IEEE wireless technologies including WiFi (802.11x), NFC, location and Bluetooth. The wireless environments can also be a combination of the above as it relates to a specific operating environment.

BRIEF DESCRIPTION OF THE DRAWINGS

Non-limiting and non-exhaustive exemplary embodiments of the present disclosure are described with reference to the following drawings in which:

FIG. 13 illustrates a test request page including possibilities for customization of a test and a report as per user requests in accordance with at least one embodiment;

FIG. 17 illustrates sample features and functionality of a device Information table;

FIG. 24 illustrates various components of a backend system in accordance with at least one embodiment;

DETAILED DESCRIPTION

Figure 1:
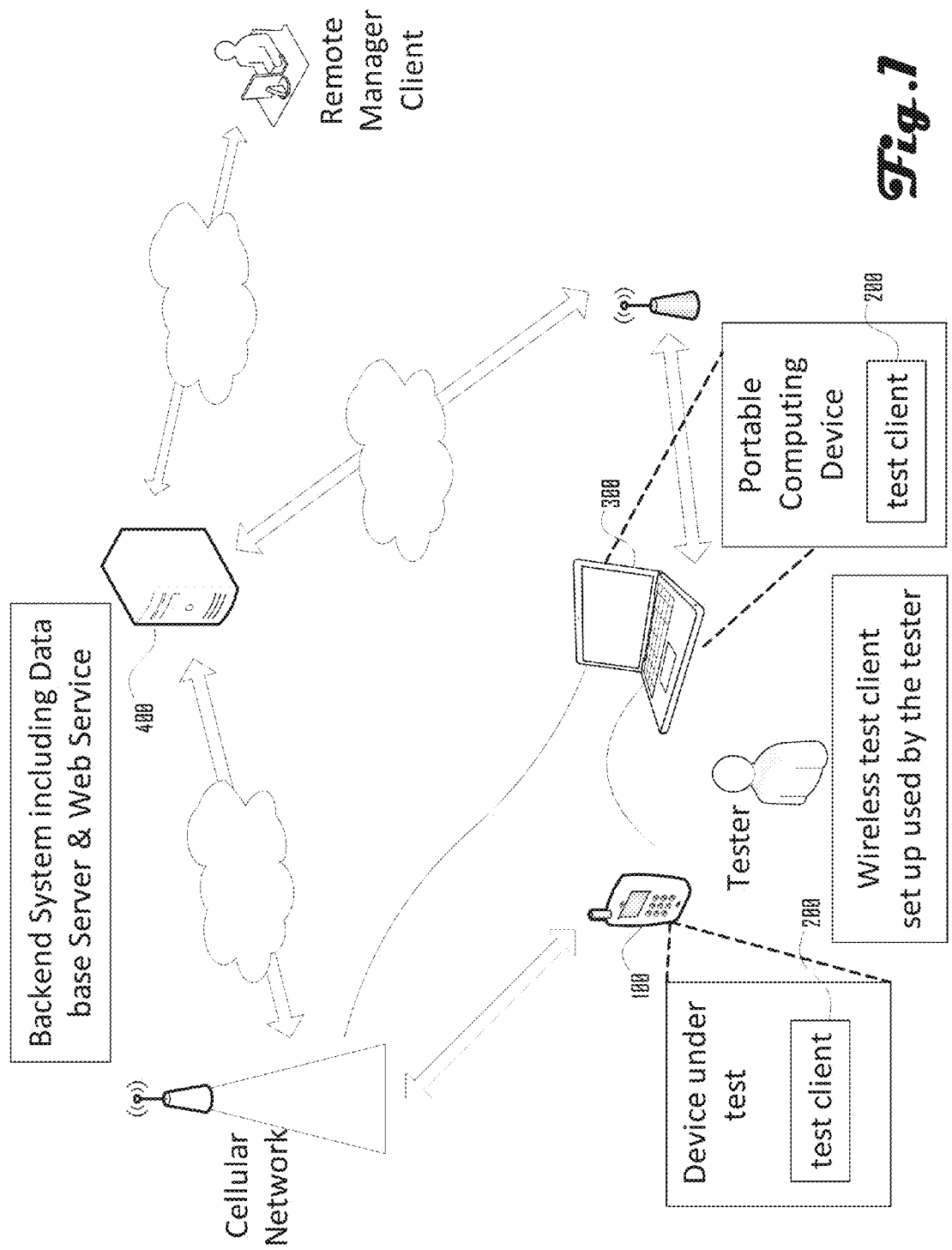
FIG. 1 illustrates various components of a performance evaluation system in a suitable operating environment in accordance with various embodiments of the present disclosure.

In the following detailed description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of a portion of the present disclosure is defined by the appended drawings and their equivalents.

Throughout the specification and drawings, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure. The meaning of "in" may include "in" and "on." The appearances of the phrases "in one embodiment" or "in an embodiment" in various places in the specification do not necessarily all refer to the same embodiment, but it may. The term "connected" or "coupled" can mean a direct connection between items, an indirect connection through one or more intermediaries, or communication between items in a manner that may not constitute a direct mechanical, systematic, physical, or other connection between the items connected. For example, in various embodiments component devices may be connected via a wireless connection that may allow for the exchange of data and/or information between the participating devices. The terms "consumer", "customer" and "user" may or may not be used interchangeably.

The various embodiments of performance evaluation systems in this disclosure are designed to collect multiple types of logs from a wireless device to determine the performance of the device or an application on the device. In one embodiment, the system performance evaluation uses a Data Collection Tool to collect Logs in multiple ways. For example, Radio Logs for Voice & Data may be collected. These are wireless Protocol Layer Logs that relate to the Radio Interface. OS/Application Layer Logs may also be collected. These are logs related to various services. These logs are generally captured by the client on the Mobile device. Context aware Connectivity logs may also be collected from the device or an external tool, which currently include logs for BT, NFC, Wi-Fi and may also include any new connectivity technology as needed. Device information logs may also be collected and include battery, memory, processor, process, and other component device logs. Once the contextual and device logs are collected at the device, in one embodiment, each individual set of collected logs may be uploaded, collectively or individually, to the Database module via a parser using a wireless network, LAN Connectivity or Wi-Fi. The parser processes all logs and combines related events. The business logic modules may be custom designed per the customer requirements and processes the parsed data. An embodiment of custom logic for business module may include data for understanding the data throughput of a device or network in comparison with other networks. Another embodiment of a custom logic may include data processing logic to determine the performance of a device under test and provide a comparative report including results from other devices. Alternatively in a third embodiment of custom business logic the data and logs are parsed to understand the performance characteristics of a particular family of devices using a common component such as a specific chipset. In a fourth example of embodiment the business logic may be developed with the logs collected to calculate the relationship of connectivity logs with performance to determine the area of performance for a particular network. For example if at a range of −65 dBm to −95 dBm the throughput is better than 12 Mbps then from the network design information it is possible to calculate the total area which has a throughput performance of above 12 Mbps. Other embodiments can manipulate the test data to analyze device, network or application performance and are considered within the scope of this disclosure. Analysis of processed data may be available to create reports. Report Generation may be accomplished locally or remotely. In one embodiment, the web service may include Report Presentation, necessary data performance ratings and custom recommendations as needed for the specific customer. In another embodiment the results of the tests may be represented in an active geographical map with logs and data displayed on the maps in different ways. A third embodiment may report the analysis and the results in a combination of maps, graphs and other forms of data representation. Other embodiments can manipulate the test data to analyze device, network or application performance and are considered within the scope of this disclosure.

Referring now to FIG. 1, various components of a performance evaluation system of services and applications on devices in live wireless environments are shown in a suitable operating environment in accordance with various embodiments of the present disclosure. FIG. 1 is a High Level System diagram, which shows components of the performance evaluation system including a device under test (100), test client (200), an external computing device (300), and a Backend system (400) that includes a database server and a web service. The wireless test client 200 may be installed and runs on multiple platforms including on Device (100), laptop (300), back end system server 400, etc. so that it may be used by the tester. In one embodiment, the mobile test client 200 includes operational control logic on a receiving client. The Back end system 400 includes, among other components, a database module and tools including: business logic modules that include reporting tools and a web service module that includes endpoints. Other configurations may include other components or a subset of the above described components to enable a collaborative environment for wireless product or a group of products testing.

Figure 4:
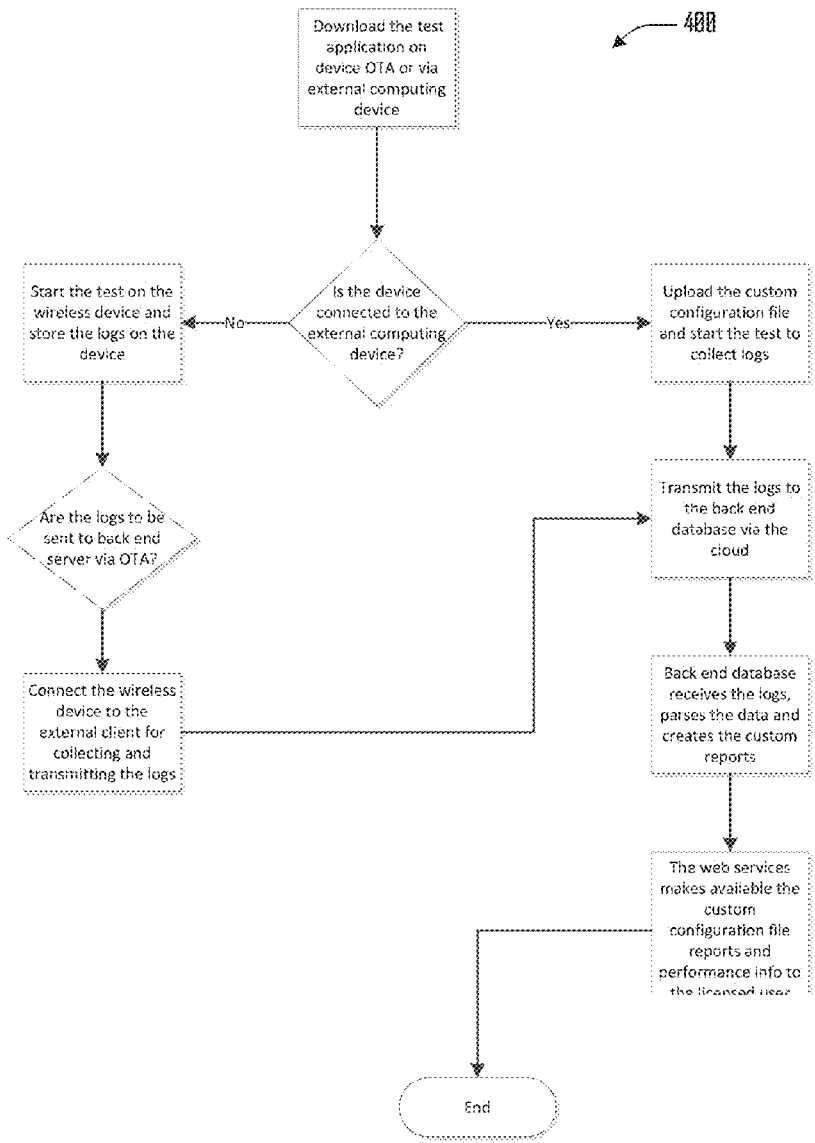
FIG. 4 illustrates a flow diagram view of a performance evaluation system in accordance with at least one embodiment in which the test configuration is downloaded, test executed, logs sent to backend server and reports generated

Referring now to FIG. 4, a flow diagram view of a performance evaluation system of services and applications on devices in live wireless environments is shown in accordance with at least one embodiment. More particularly, FIG. 4 is a system flow chart of a sample scenario. In the illustrated scenario the test application and the custom configuration file is downloaded on the device under test (100) via an over the air methodology or via the external computing device. The test is run and the associated logs and device information are either sent to the back end server (400) directly over the air or through the external computing device (300). If it is connected to the device under test. The back end system completes the parsing and analysis of the data using the custom business logic and creates the reports. The customer may see these reports via a web service.

In one embodiment, the Test Client 200 or Client application on an external computing device, such as a laptop or another wireless device, interfaces or connects with the device under test. This client is capable of configuring the test allowing for user input. This variable configuration file can be made available to a user at the site of testing or a remote user. The collected device logs are then transmitted to a remote database via a wired or wireless interface. The client application may also have a user interface that may convey the status of the test to the user and may also allow for certain remedial action (such as restarting the test). The back end system database server 400 receives the combined logs from the client application or directly from the device under test. The parser formats the received logs and deposits the data into the relational database. Business Logic Server/application, in one embodiment, has the logic to generate reports and ratings. This node in the system may have a predetermined logic as well as a customized logic that the user can generate via the web service. The Web service may provide the interface to the licensed user. In one embodiment, the web service may have an interface that allows the user to provide certain customizations to the test and may also allow the user to generate custom reports. In another embodiment the web service has the logic to manage permissions and authentication for the user and/or a group of users. The performance evaluation system may also include User experience modules that include user authentication, certificate based transactions and user interface presentation. Other embodiments can manipulate the test data to analyze or troubleshoot device, network or application performance and are considered within the scope of this disclosure.

Figure 2:
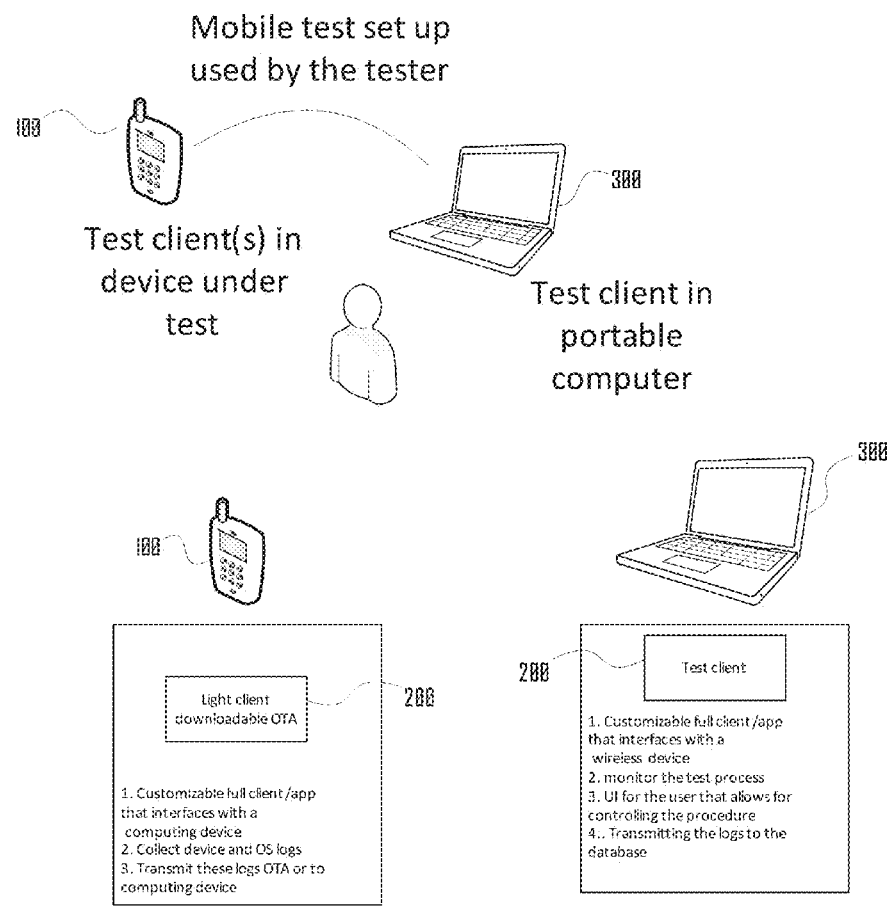
FIG. 2 illustrates various test clients and components of the test client configured in accordance with at least one embodiment.

Referring now to FIG. 2, various test clients and components of the test client are shown configured in accordance with at least one embodiment. FIG. 2 shows a Test Client(s) (200). The full client/application may reside on the external computing device (300) which when connected to the device under test (100) controls, manages and monitors the test. The external computing client receives the logs and device information related to the test and transmits this to the backend. The device under test may have a light client that can be downloaded over the air. This client will be capable of running the test and transmitting the logs and device information back to the server over the air or at a later time to the external computing device when it is connected. In one embodiment, the front end of this test client tool is a software client application on the Mobile Operating System (e.g., Android; Apple IoS or Windows Phone) that may include the ability to:

1. Load a Test Configuration File, where a User customizable Test scripts can be run. The user customizable Test scripts are run sequentially or in parallel and can target various Applications or Services that are already available on the Mobile Device.
2. Run a Debugger/Logger of the events and protocol messages related to each Service/Application that are run from the above and store the results in separate log files. This would include also capturing radio level protocol logs.

In one embodiment, the test client may use Laptop USB connectivity to a Mobile device to run a configuration app and to upload log files to an external storage location.

As previously shown, the test client 200 can be installed on the device under test [100] and on an external computing device. The test client 200 can also be updated by the back end system server. At least two variations of the test client 200 may exist.

In one embodiment, the light client may be present on the device [300] and this may communicate with the full client on the external computing device [200]. The configuration files and the test scripts related to a specific routine as identified by the customer and uploaded on to the device under test [300] via the external computing device [200]. The tests are then run and logs collected. These logs are then packaged and sent to the back end system [400] via a communication channel from the external computing device [200].

In another embodiment, the device under test [100] may act independently and run the test as directed by the user. The collected logs may be packaged and sent directly via a communication channel to the back end system server [400] thus not requiring an external computing device [200].

In one embodiment, the Test Client on the device consists of at least two Applications that are mutually exclusive. The first application is a Test Configuration Client. One sample process block diagram of the Test Configuration Client is shown and described in FIG. 2. The Test Configuration Client collects device information from the device as follows [201]: Device Name, Device Software Version, Device Hardware Version, Device Firmware version, and Test Date/Time. In one embodiment, the collected information is put in a folder "Device Info" for later access. The Test Configuration Client may also load User customizable UI script that loads a Test Script UI that the user can use to select the tests that needs to be run. The selected tests can be run in sequence or simultaneously. The running of the selected test scripts enable the Event logging Trace [202] on the Debugger Tool (Internal OS Tool) to log information. For example, the following table provides some available tests that may be selected.

| Test | Collected Information | Input |
|---|---|---|
| Run Voice Test | Start/Stop MO Call<br>Select Duration of Call | Click to select<br>-X- mins |
| Run Data Test | Start/Stop Data FTP Test<br>Select Server URL | Click to select<br>ftp://server . . . |

-continued

| Test | Collected Information | Input |
|---|---|---|
| Run Browser Test | Start/Stop Browser Test<br>Select Browser URL | Click to select<br>http://www.cnn . . . |
| Run Email Test | Start/Stop Email Test<br>Select Email URL | Click to select<br>http://www.gmail . . . |
| . | . | . |
| . | . | . |
| . | . | . |

The logging and filtering of the Event logs [203] by the Test Configuration Client is also shown. The event logging captures designated events that are running on the Mobile device under test. These include not only the events related to the Test being run but also other useful information like radio signal information (Signal Strength, Signal Quality), Data State, Phone Manager state, Location Info etc.

Next the system is shown parsing and saving of Logs into Folders [204]. In one embodiment, different captured logs may be collected in combined logs. To run the correct metrics from the captured logs, the combined logs must be parsed. In one embodiment of the client, the initial parsing of the combined logs can be done in the Device under Test (DUT). This initial parsing of the combined logs is to separate the combined logs pertaining to an event into separate folders that can be easily uploaded to the back end system server where the business analysis can be done. In another embodiment, the combined logs are captured by the external computing device attached to the Mobile device under test and parsed into their separate folders.

Next, the system uploads log folders to the back end system, which may include a database server [205]. In one embodiment of the process, the Log folders can be uploaded using Wi-Fi to the back end system Server. In another embodiment the Cellular Communication channel itself can be used to upload the combined logs.

Figure 6:
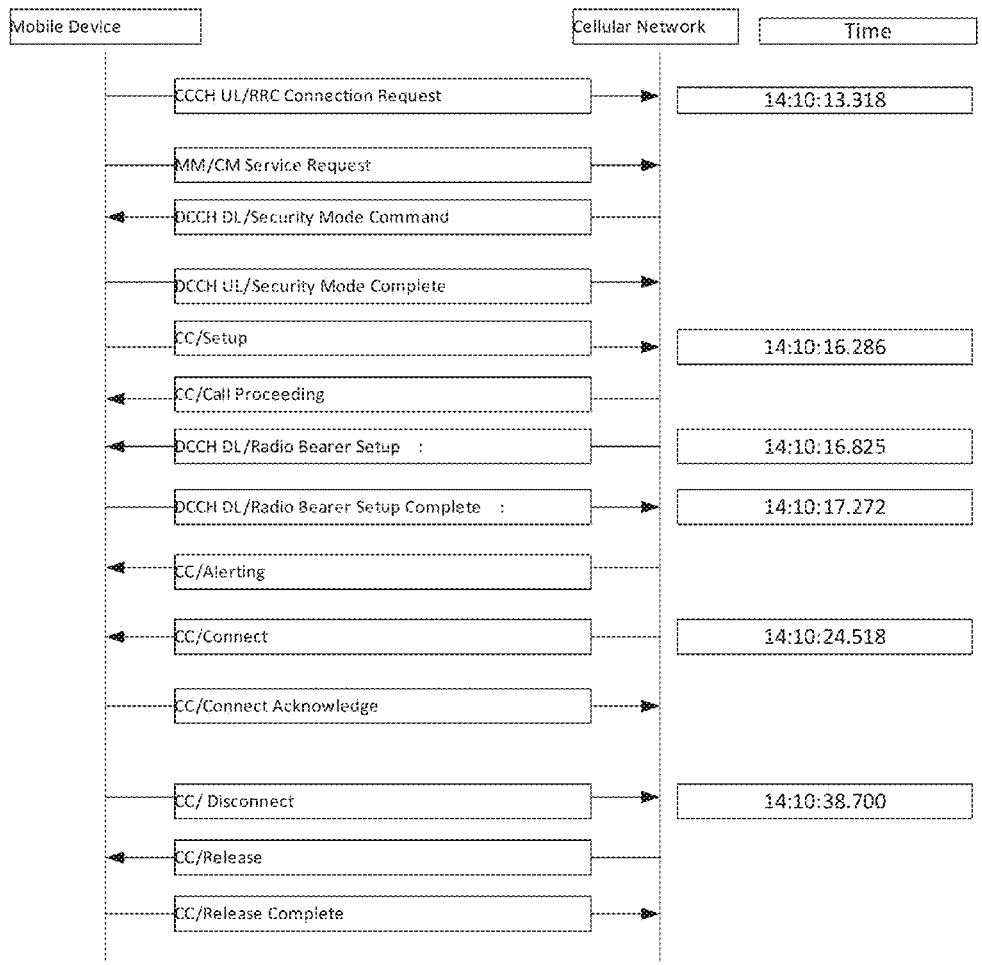
FIG. 6 illustrates a sample of the radio logs including time stamps that are collected during a voice call test in accordance with at least one embodiment using an external tool.

Referring now to FIG. 6, radio logs collected during a voice call test are shown in accordance with at least one embodiment. The chart depicts activities and events associated with a particular call. These may vary depending on the network and device technology and hence will be unique to the test. The logs may also include other information, for example location etc. as per the design of the test and the custom test configuration. In this particular example, the different protocol states of the Radio Call Control (CC) may be observed. As seen from the combined logs, the time to connect the call is the time difference between the Connection Request [14:10:13:318] and the CC/Connect [14:10:24:518] which is approximately 11 seconds.

Figure 5:
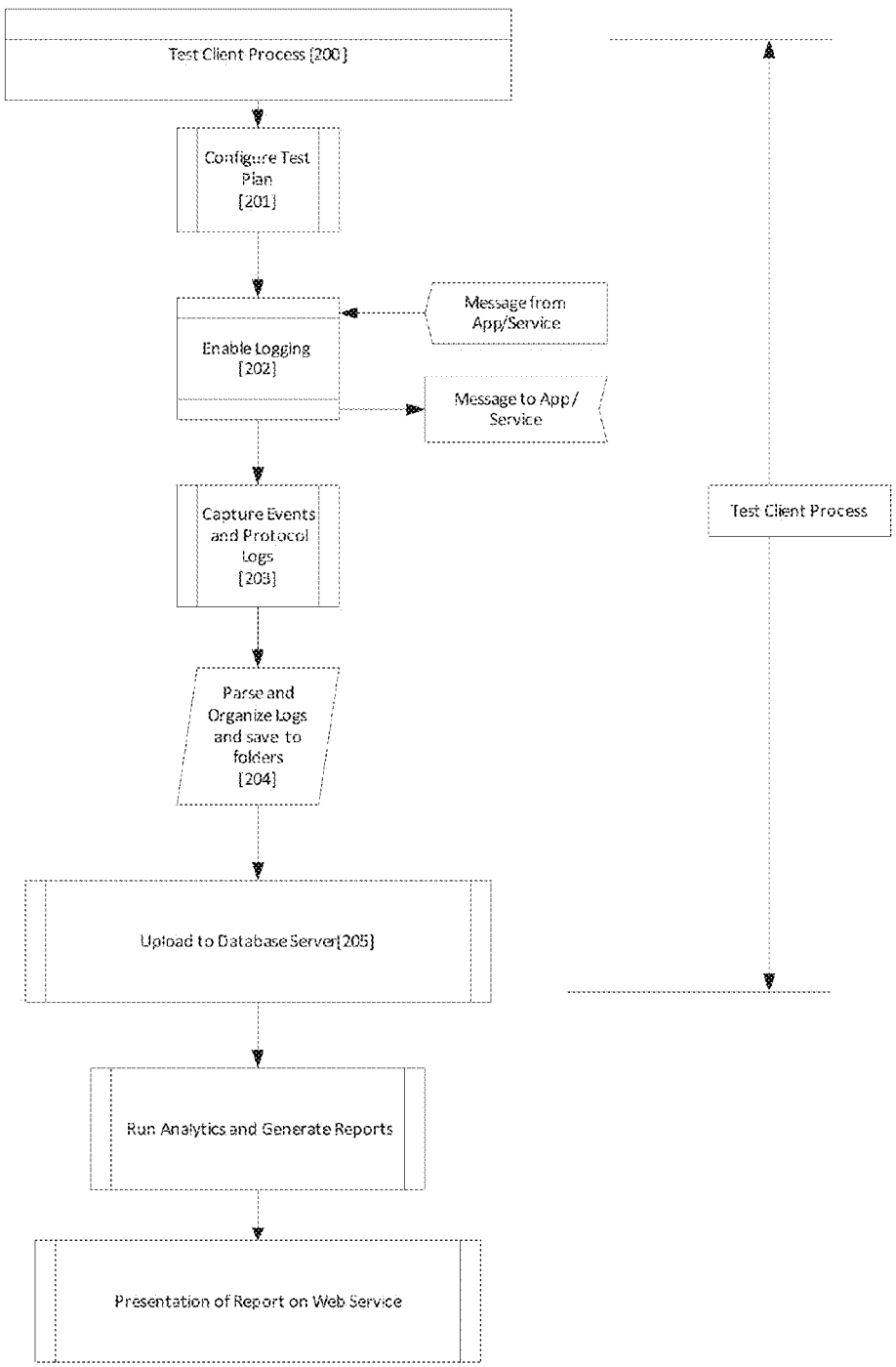
FIG. 5 illustrates a flowchart of a test client process demonstrating the process flow within the client that culminates in test log data being uploaded to the backend server.
Figure 7:
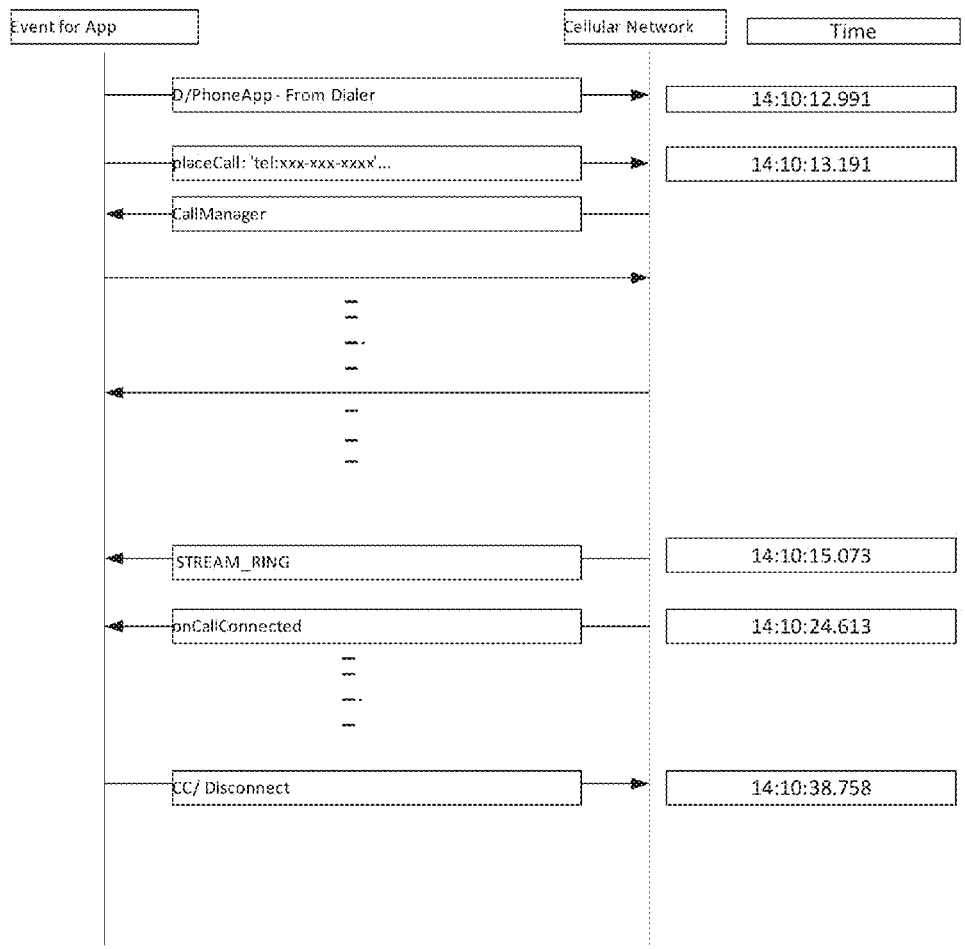
FIG. 7 illustrates a sample of the Operating System (OS)/Application event logs including time stamps that are collected during a voice call test in accordance with at least one embodiment.

Referring now to FIG. 7, Operating System (OS)/Application logs collected during a voice call test are represented. More specifically, FIG. 5 depicts activities and events associated with a particular call. These may vary depending on the network and device technology and hence will be unique to the test. These logs may also include other information, for example location, etc. as per the design of the test and the custom test configuration. In the example shown in FIG. 7, we can see the different Event states related to a Voice Call. Various performance information can be gleaned from the logs. For example, as seen from the combined logs, the duration of the call is the time difference between the Connection [14:10:24:613] and the Disconnection [14:10:38.758] which is approximately 14 secs.

Referring now to FIG. 5, a flowchart of a test client process 200 is shown in accordance with at least one embodiment. The user can use the default test configuration or customize the configuration (201) that is used in the test. Logging is enabled (202) and the captured logs (203) are parsed, packaged and saved (204). The test client then sends these logs and device information to the back end system (205) that stores this information in the database, analyses and creates reports. These reports are then made available to the licensed user.

Device Testing: Application(s) may be on the wireless device that runs the test process. This app can be an independent on device application or a larger application that is controlled by an external device. The test application can be used to test and determine the performance of multiple Software and hardware components (e.g. chipset) of the device. In addition certain pre-determined consumer and enterprise applications can also be tested.

Collecting Logs: The test client applications 200 collect data and logs from the Operating System as well as the lower layers of the device (such as chipsets and other hardware) from the device and store it in a predetermined file on the device. When the device is connected to an external computing device (via USB for example) the combined logs can be downloaded or streamed to that device. This may be accomplished by collecting device logs that pertain to the entire stack (Operating system as well as the silicon and radio) and combining the combined logs of various layers of the device and network communication protocol for devices in which the various logs need to be collected separately.

In one embodiment, controlling the test process including methods for initiating, controlling, managing and termination of the tests or operation on the device from a local or remote location. Also installation of the configurable device client software may originate from a local or remote location. Controlling the test process may also include methods for transferring the combined logs either in real time or at a delayed time to a computing device (memory card, laptop or server). In one embodiment, the test process may also include methods to auto-detect the device based on custom set of variables. In one embodiment, the test process includes methods for auto configuration of the test/operation and device based on a custom set of variables, which may or may not have been provided by the test requestor. The test process may allow configuring of the test from a local and/or remote location.

In one embodiment, encryption may be used to secure the combined logs: Encryption may occur during collection of the logs and/or during the process of combining the logs so that the resulting combined logs would be encrypted. For example, one may use custom logic to encrypt the device logs and data prior to transmitting them. Decryption of the encrypted combined logs may start with an authentication process on the backend system. This process may safeguard the data to improve veracity of the results.

The performance evaluation system may monitor a variety of locations and devices within the target test system. In particular, the system may be monitored at various points including wireless device, computing nodes, and reports. The monitoring allows for local or remote control of the system.

Figure 3:
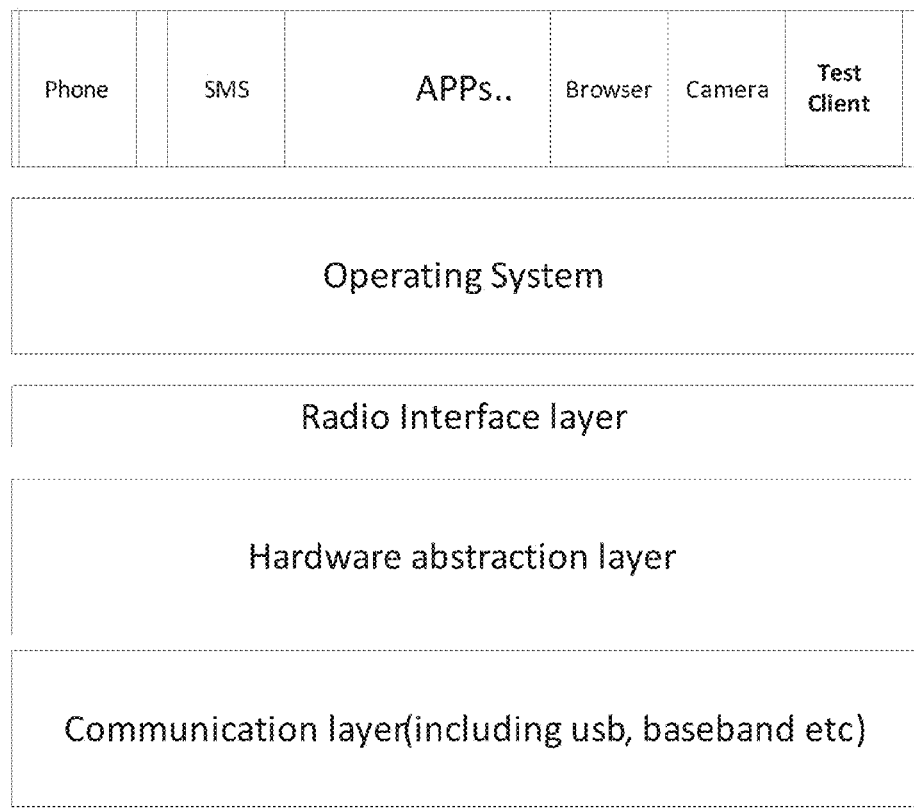
FIG. 3 illustrates architecture of a device loaded with a test client application in accordance with at least one embodiment.

Referring now to FIG. 3, the architecture of a device loaded with a test client application in accordance with at least one embodiment. More particularly, a view of the various architecture, abstract, and SW layers of a typical wireless device is shown. The actual implementation may vary by device. The test client will be loaded on to the application layer as an application.

Figure 22:
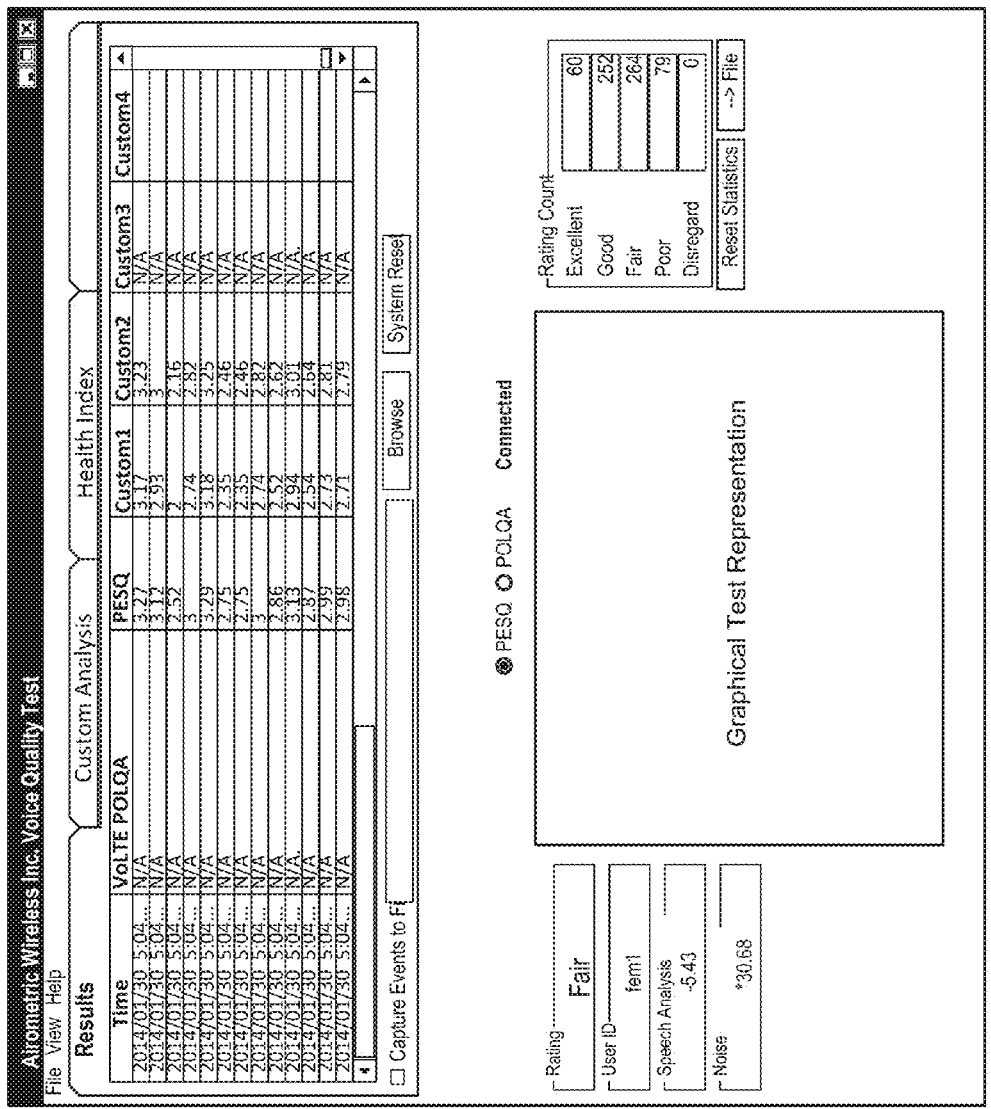
FIG. 22 illustrates a screen shot of an external tool for voice quality test being integrated into the performance system in accordance with one embodiment.
Figure 23:
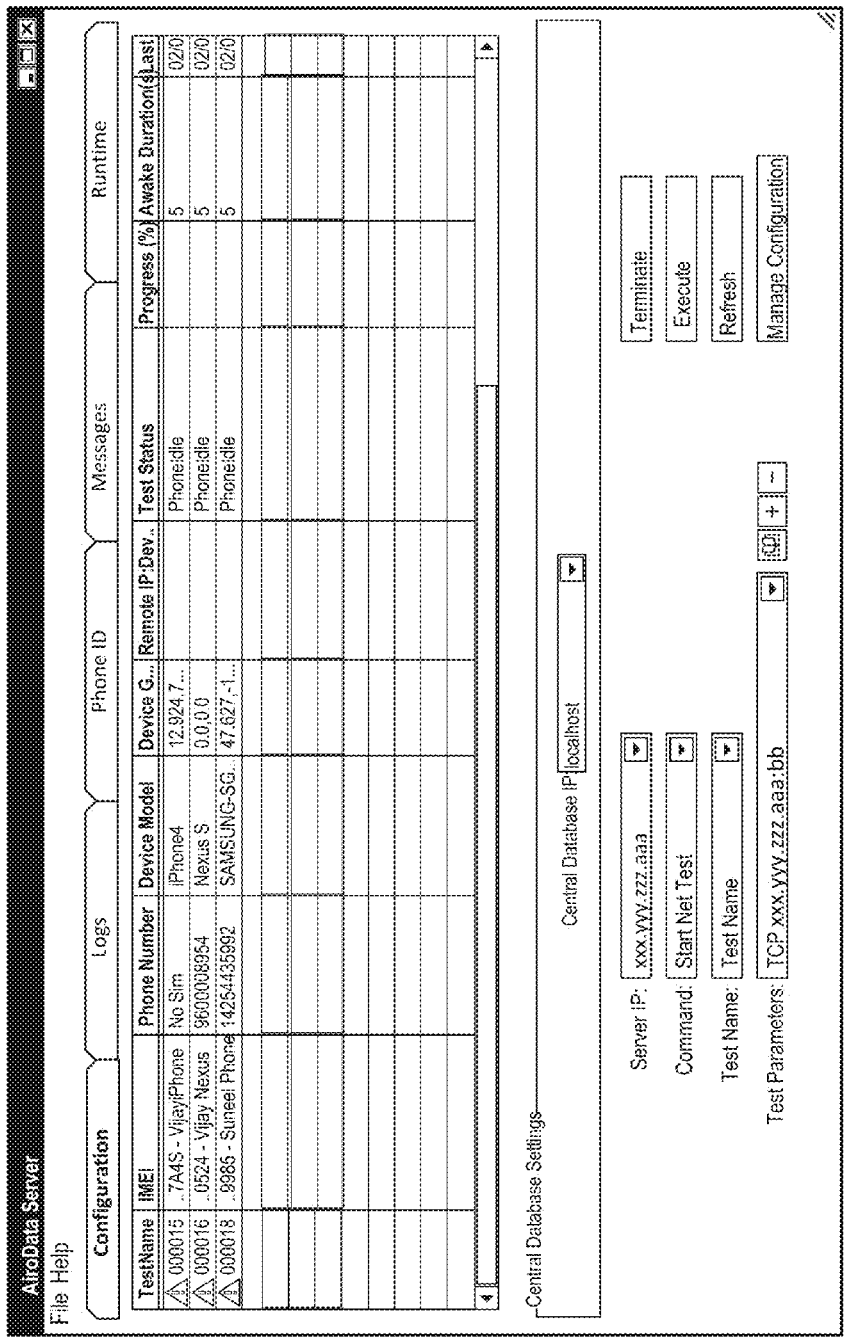
FIG. 23 illustrates a screen shot of an external tool for specific data test being integrated into the performance system in accordance with one embodiment.

In one embodiment, the device under test can be any wireless device. A wireless device can be a mobile device or a fixed wireless device. The system described in this invention consists of test applications that can be run independently on the device under test or can be controlled by a client application on an external computing system. The communication method between the device under test and the external computing device can utilize any standard technology such as a USB connection or a Bluetooth (BT) connection. This system can auto-detect the identification of the device under test by collecting device specific and software specific information. In one embodiment, the device under test and the client on the external computing device can collect device logs (including OS, baseband and hardware) and package this before transmitting. FIG. 22 and FIG. 23, illustrates a screen shot of an external tool for specific voice and data tests being integrated into the performance system in accordance with one embodiment The system can consider a variety of metrics including Voice and Audio Services/Apps, such as CS Voice-MO and/or CS Voice-MT.

The CS Voice-MO may include:
1. Call setup time (M-M; M-L) in LTE(CSFB)/HSPA/GSM coverage
   a. what are the differences?
   b. what are targets?
2. Call drops—Cause Coverage/Congestion?
3. Call continuity (HO success rate across different Networks)
4. Supporting radio logs The CS Voice-MT may include:
1. Paging Success rate under
   a. Normal Conditions
   b. Voice and Data (background) conditions
   c. LTE Packet data Conditions
   d. Supporting radio logs Other system Services/Apps that can be evaluated include Conference Calls-Lync, VoIP (Wi-Fi calling/VoLTE) using metrics as outlined above, Music Streaming (Pandora) performance, VoiceMail Performance, Combinations of the above, and Location based Services and Voice/Music.

Figure 9:
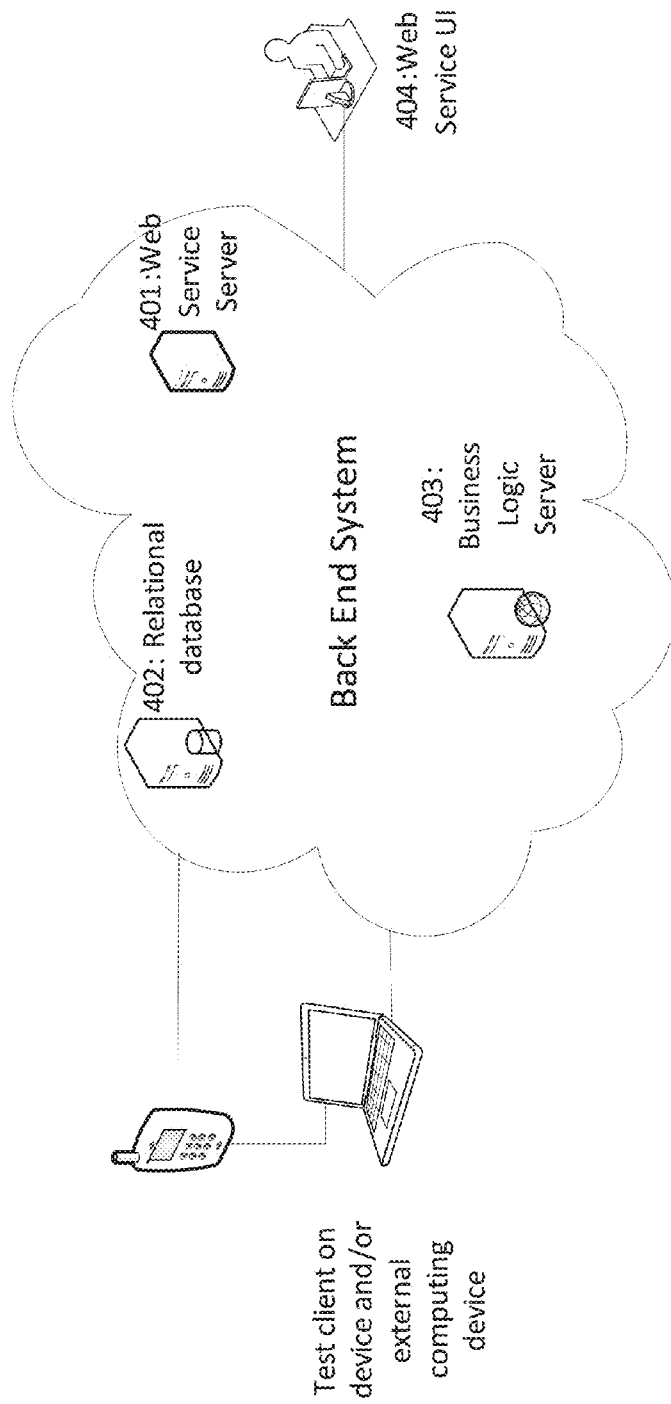
FIG. 9 illustrates various components of a backend system in accordance with at least one embodiment.

Referring now to FIG. 9 and FIG. 24, various components of a backend system are shown in accordance with at least one embodiment. The backend system (400) at a minimum includes a web service server (401), relational database (402), Business logic unit (403) and a web service UI module (404). The web service server (401) receives the logs and device information from the device under test (100) or the external computing device (300). These logs are decrypted, parsed and stored in the relational database (402) as per the database schema. The business logic server (403) custom logic associated with the particular test or user is applied to the data to create reports and analysis that this made available to the user (may be licensed) via the Web service UI (404).

The back end system processing portion of the system includes a relational database (402), a business logic unit (403) and a web service (401). The web service (401) includes a User Interface (404) that enables the licensed user to generate the reports and provide customization. This back end system may receive the combined logs via the client application or directly from the device via a wireless network.

In one embodiment, the backend system 400 may use one or more of the following methods and processes:
Encryption/Decryption: The data and logs may be encrypted and decrypted
Data Storage: The data is eventually sent (via tethered means or the cloud) and stored on a relational database.
Data parsing: Data is parsed using accustom logic that allows for various reports to be generated that are pivoted on custom requirements
Generating reports: The reports are generated using custom logic and are made available to licensed users. The data from testing may be crowd sourced and utilized to provide a performance rating to the device or application under test.
Providing Web service: An interactive web service may be provided to licensed users that may allow these users to customize their reports and test process based on their license agreement.

In various embodiments, the network may include at least one of a wireless network, the Internet or an intranet. Accordingly, a participating telephony device may be any wireless device.

Figure 10:
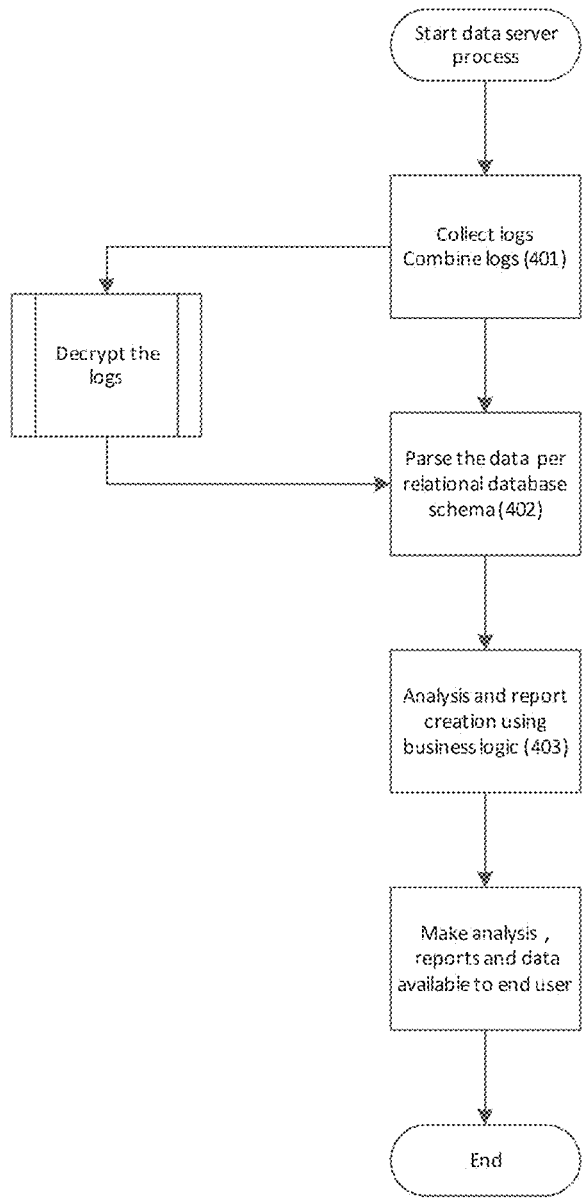
FIG. 10 illustrates a flow diagram view of a test routine analysis and process in accordance with at least one embodiment in which an external test tool maybe used in conjunction with the device client.

Referring now to FIG. 10, a flow diagram view of a test routine analysis and process is shown in accordance with at least one embodiment. The flow diagram depicts one embodiment of a test routine analysis and process as per the description in FIG. 10.

In one embodiment, collecting the performance of an application utilizing a wireless device may include one or more of the following methods and processes. Collecting device logs that pertain to the entire stack (Operating system as well as the silicon). Combining the logs of various layers of the device. Originating, initiating, controlling, managing and terminating of the tests/operation on the wireless device. Transferring the combined logs either in real time or at a delayed time to a computing device (memory card, laptop or server). Auto detection of the application/device based on custom set of variables. Auto configuration of the test/operation and application based on a custom set of variables. Configuring the test/operation from a local or remote location. Scheduling the test/process from a local or remote location.

Monitoring the operation on wireless device may include at least one of the methods of log analysis or custom test probes to gain an understanding of the status of the tests including the status of normal progression, abnormal progression or an unexpected state. This information may be utilized along with human understanding of the environment to determine the next steps. For example one step might include taking remedial action to ensure that the tests are completed. Another step is to validate that the complete logs have been collected.

In one embodiment the status of the tests is transmitted to a local or remote location. Initiating remedial action to be done from the local or remote location.

The log files and metadata of the test procedure may be packaged, encrypted and transmitted in a secure environment. Decryption of the packages may utilize custom authentication methods including but not limited to use of certificates, parity checks and other authentication methodology.

The test results and the combined logs may be analyzed using a procedure and logic that includes information from the device under test, network and any associated back end system servers. The analysis procedure may have a custom logic to meet the customer requirements. For example in one embodiment the call performance may be analyzed from the combined logs of the device and from network traces provided by the Mobile Operator to highlight dropped calls due to inter radio technology handovers. In another embodiment the device OEM might want to use logic to determine if the device fails to set up a data call in a particular application and radio technology. In this scenario logs are taken from the device and can be analyzed with additional information from the application server that might be provided. Thus the analysis logic can be customized as per the customer needs, request or other criteria. Other examples of reports are shown in Fig The test results, logs and reports may be made available to the customer via a web service.

Figure 12:
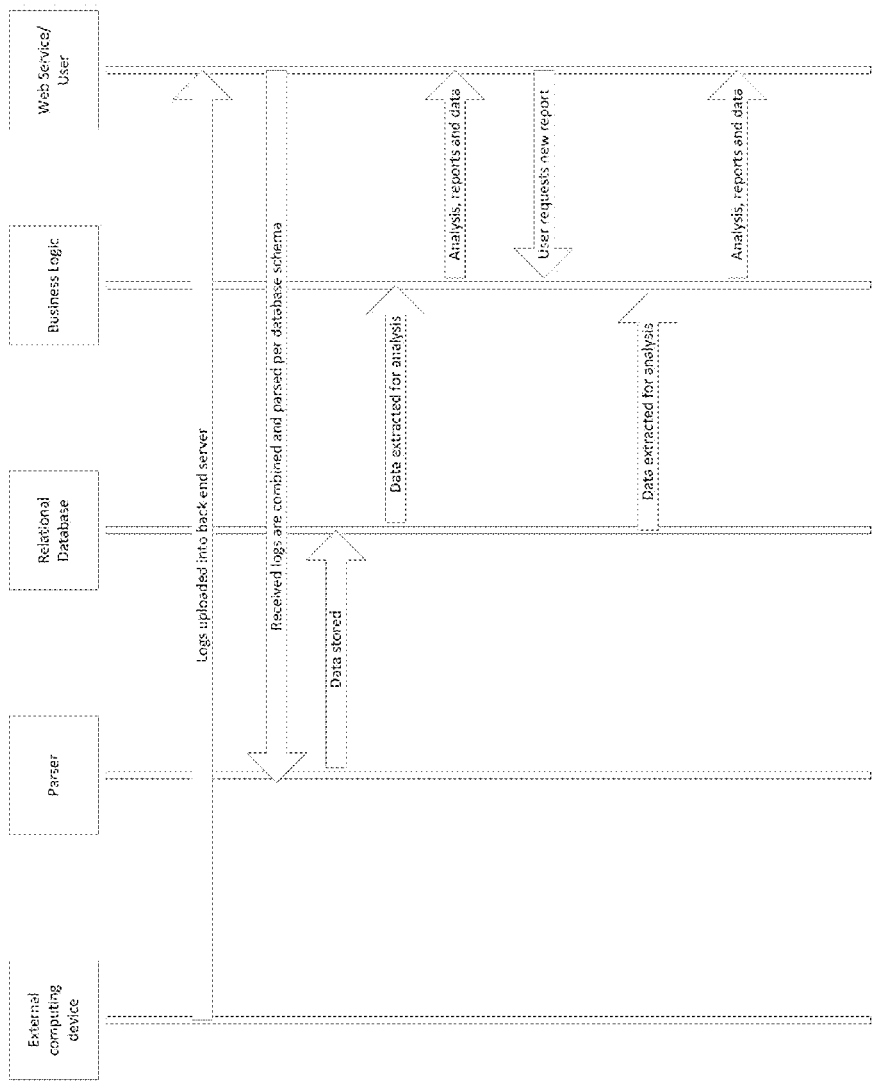
FIG. 12 illustrates a communication flow diagram associated with a user request for a default (pre-defined) test and report coupled with a request for a new test report using the same logs and data in accordance with at least one embodiment.

Referring now to FIG. 12, a communication flow diagram associated with a user request for a default (pre-defined) test and report coupled with a request for a new test report using the same logs and data is shown in accordance with at least one embodiment. In this example the business logic associated with the new report is applied to the same logs and data to create this new report.

Sample Communications flow for a pre-determined report combined with new user report using the same set of data and logs is referred to FIG. 12. For example the user might have asked for a report of dropped calls and on seeing this report now wants a new report indicating the number of background data calls that happened during the same test. This supplemental report request can be analyzed using custom logic.

Figure 11:
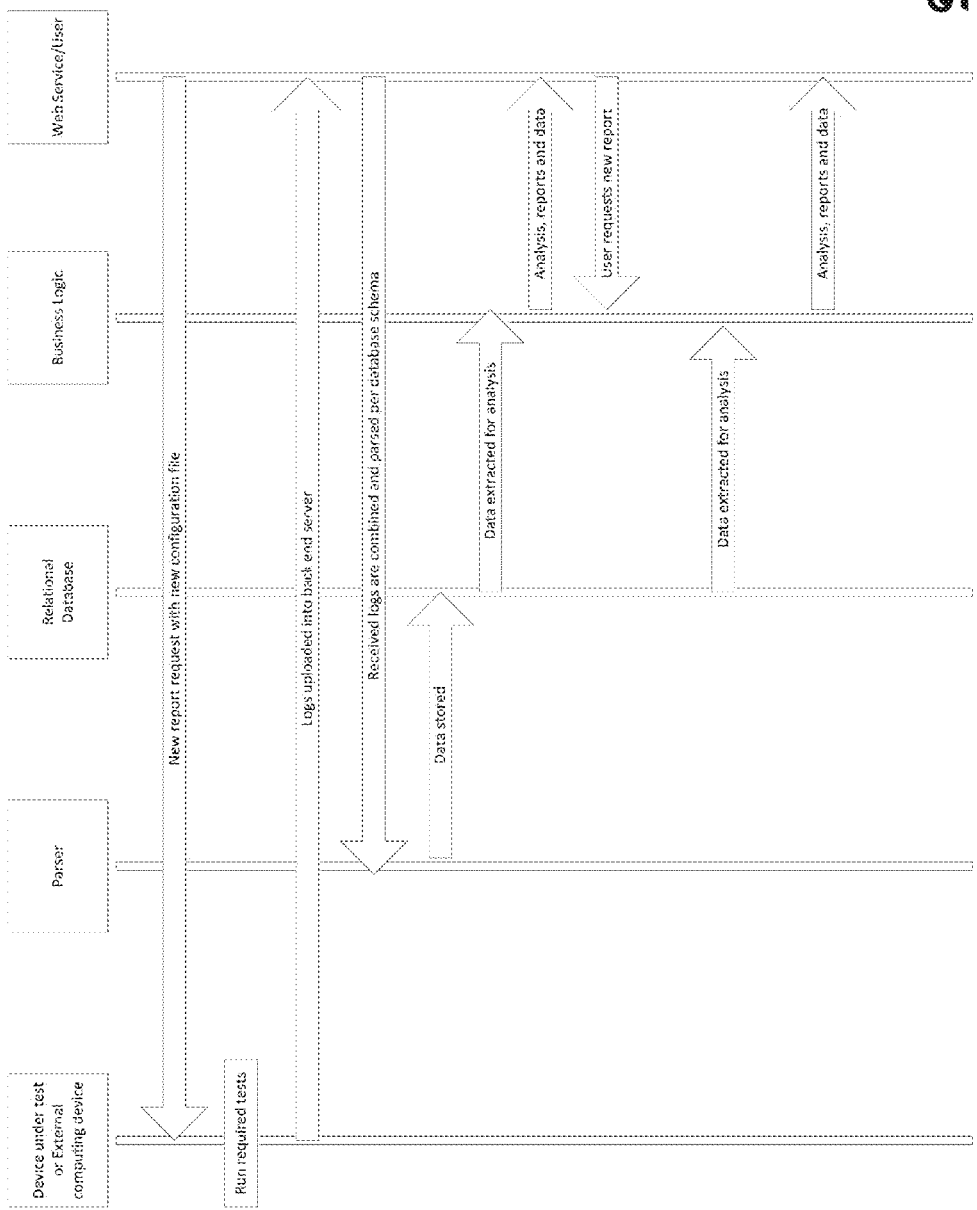
FIG. 11 illustrates a communication flow diagram associated with a user request for a new test and report in accordance with at least one embodiment.

Referring now to FIG. 11, a communication flow diagram associated with a user request for a new test and report is shown in accordance with at least one embodiment. The sample communication flow associated with the user request for a new test and report. The user might now design a new test request for the next test run and the sample communication flow is shown in FIG. 11. This requires a new configuration file that is sent to the device under test (100) or to the external computing device (300) so that the test client (200) can manage and run the customized test. This also shows the user requesting new test report using the same logs and data. In this example the business logic associated with the new report is applied to the same logs and data to create this new report.

Turning now to the Web service user interface, in one embodiment, the web service may include:
1. Allow the customer to get custom reports that can be pivoted on various pieces of data utilizing data from a single test or multiple tests.
2. Present ratings based on predetermined or custom logic
3. Provide a custom user interface based on the rights and privileges accorded to the end customer The method may be enhanced with data or tools external to the test procedure including but not limited to network logs, network design information and application information.

Figure 13:
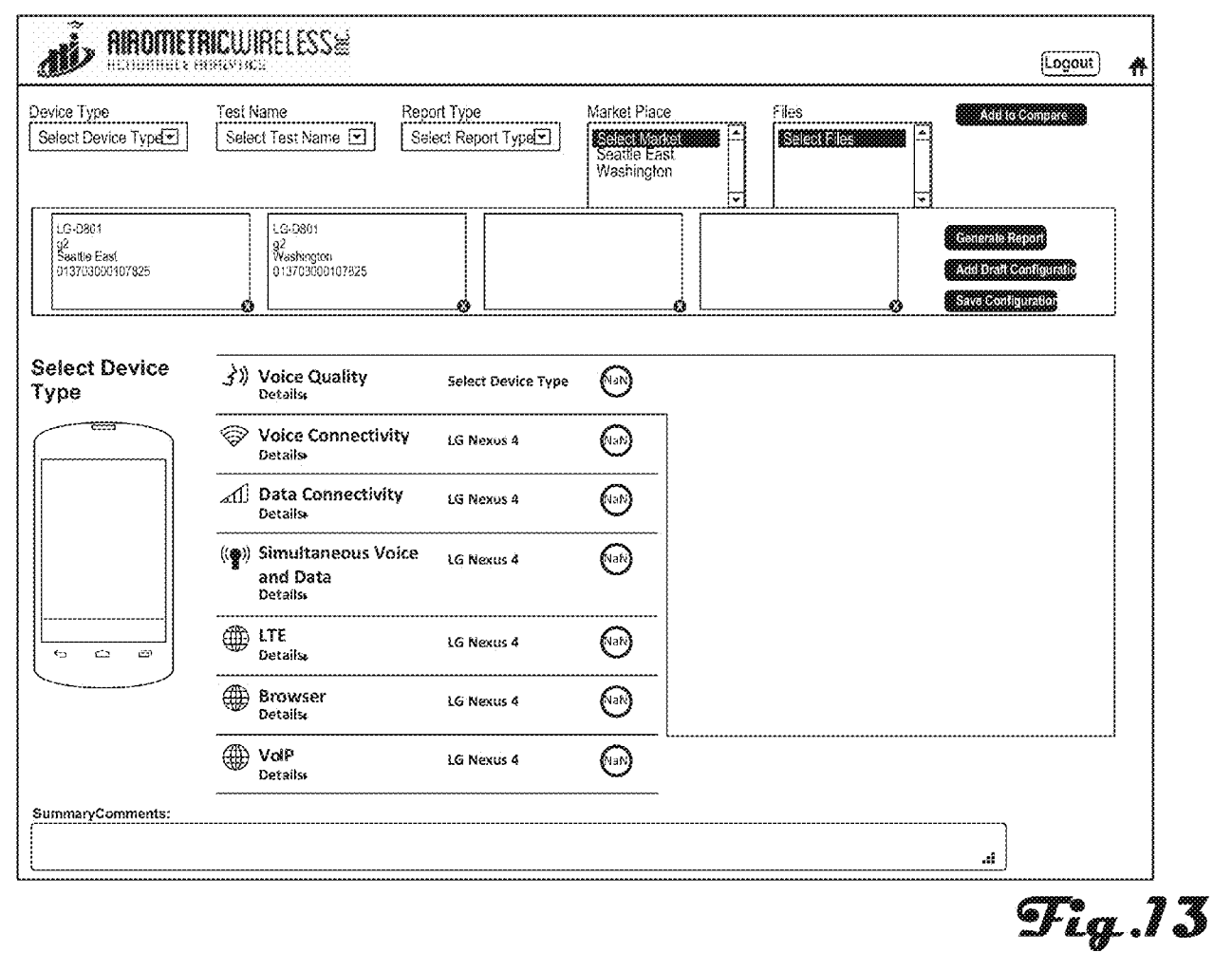

This system can by utilized by various entities to determine the performance of a device or application and develop an understanding of the cause of this performance This system can by utilized by wireless Operators
This system can by utilized by wireless device application creators
This system can by utilized by enterprise entities
This system can by utilized by device manufacturers
This system can by utilized by end consumers The Web UI may have the following features and/or functionalities
1. Landing Page
   a. Products—Device testing, Application testing
   b. Process—MO/OEM/consumer/enterprise
   c. Ratings of recent devices in Market
   d. Crowd sourced user rating
   e. User comments on devices
   f. MO/OEM response
   g. Login to move onto custom screen based on user permission
2. Custom Screen for the user
   a. Welcome information
   b. Previous reports available to user
   c. Request new test or report
   d. Payment options
   e. Feedback Referring now to FIG. 13, a test request page including possibilities for customization of a test and a report as per user requests is shown in accordance with at least one embodiment. This shows one embodiment of a Web Service UI test request page: While this is a functional depiction of a possible test request page made available to the licensed user, it is understood that other components may be added or removed from the request page. The sample set of features shown here indicate the possibilities for customization of the test as per the user.

Figure 14:
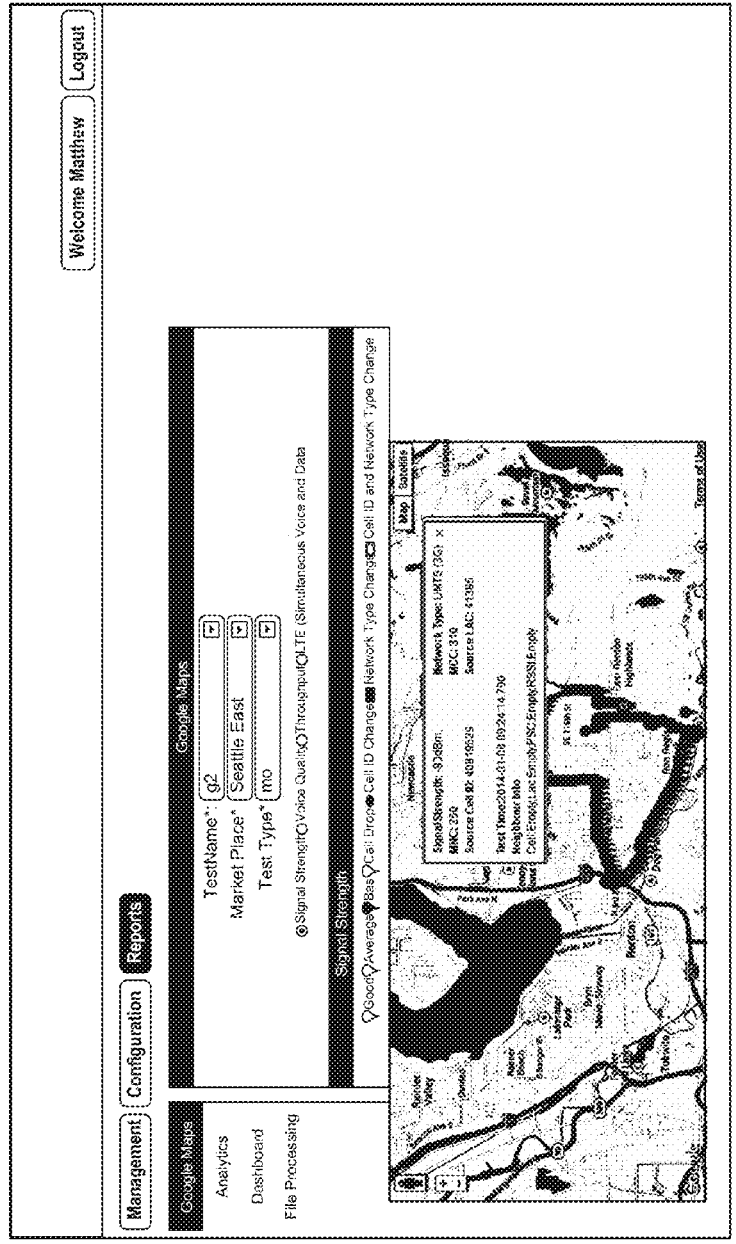
FIG. 14 illustrates a report page for a voice call made available to the licensed user in accordance with at least one embodiment.
Figure 15:
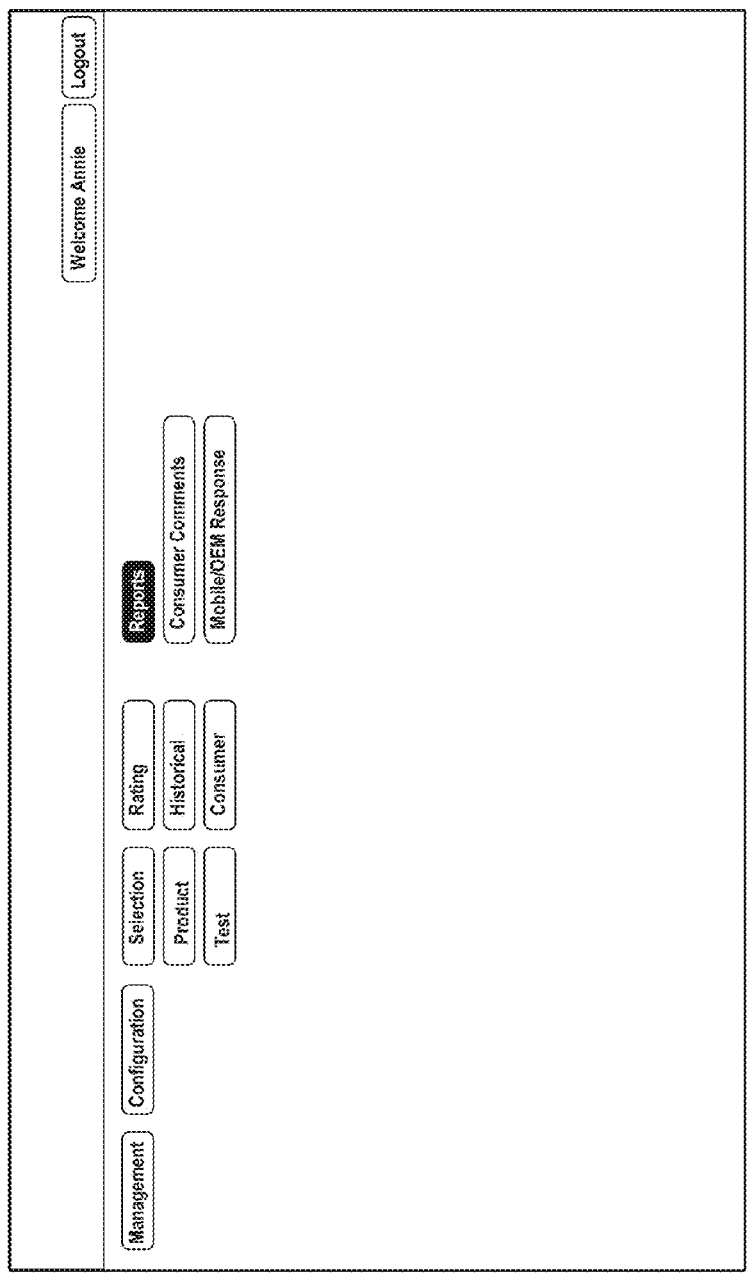
FIG. 15 illustrates the components for a Web User Interface landing page in accordance with various embodiments of features and functionalities.
Figure 16:
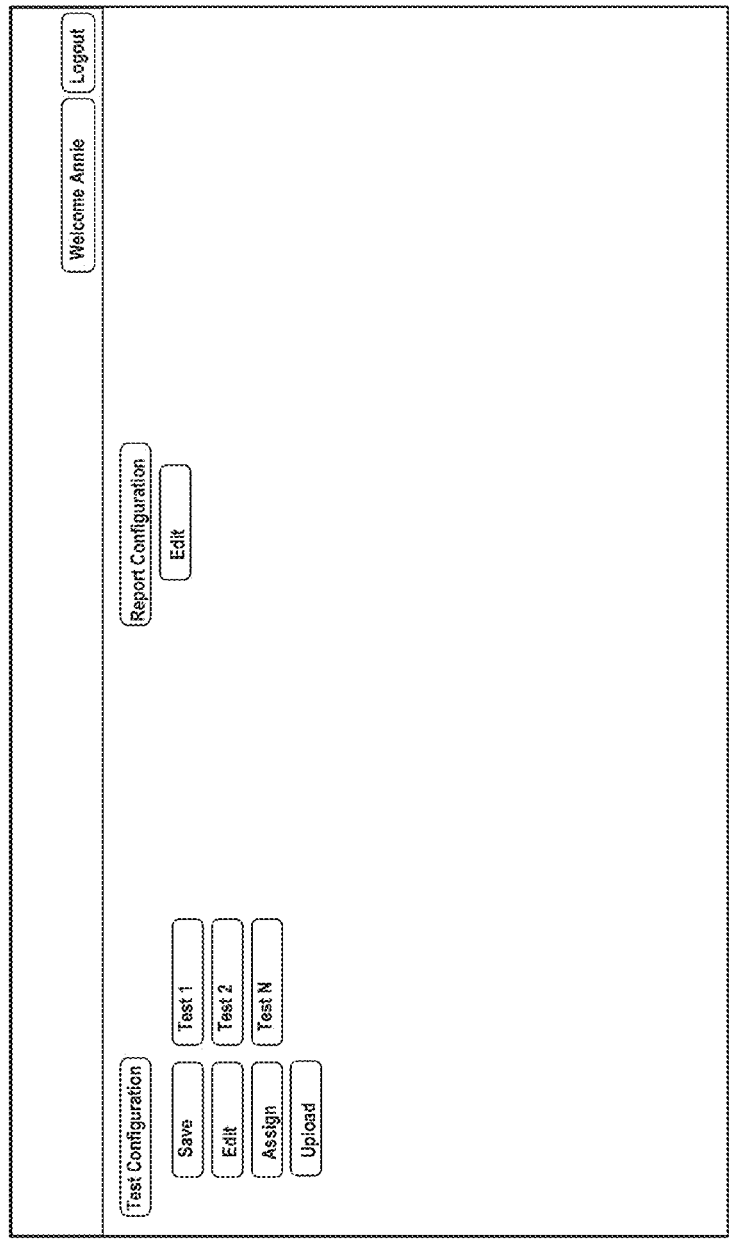
FIG. 16 illustrates sample features and functionality for a Web User Interface for the configuration of devices, tests and reports in accordance with various embodiments.
Figure 18:
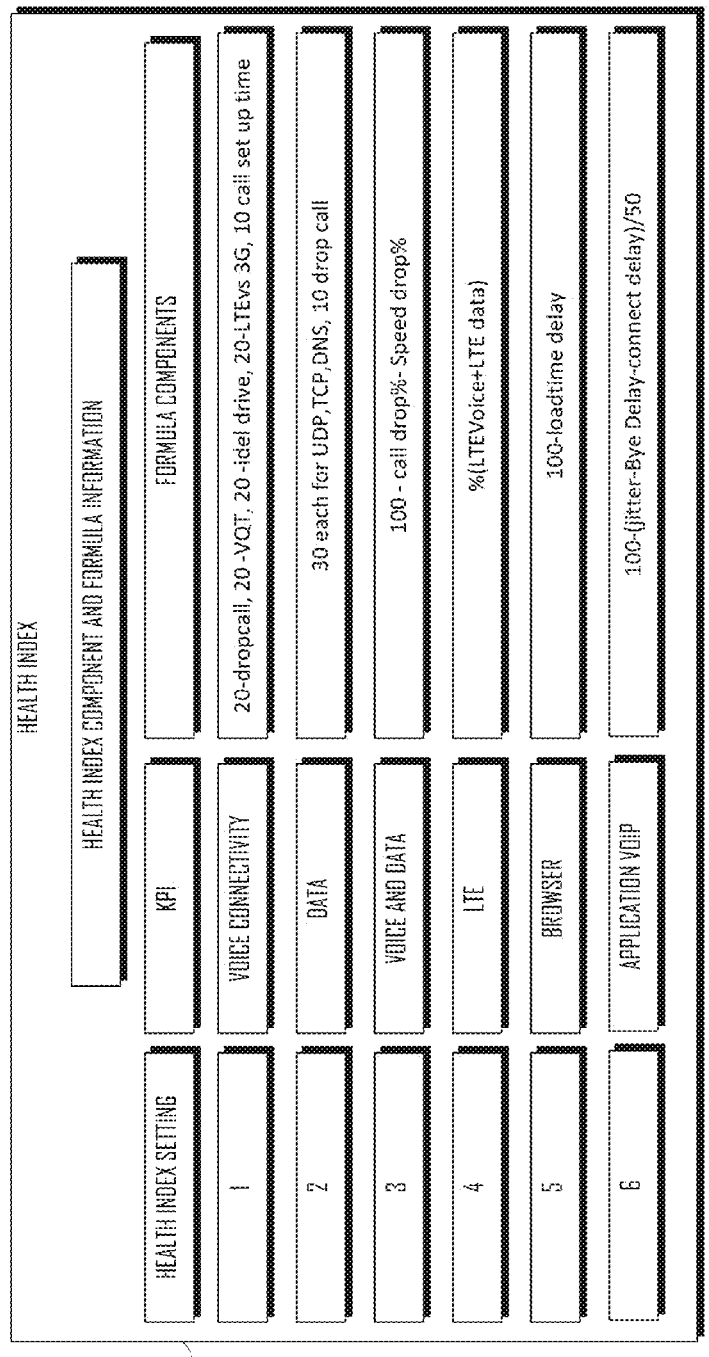
FIG. 18 Illustrates Sample Health Index components and a set of Health index formula in accordance with various embodiments.

Referring now to FIG. 14, a report page for a voice call made available to the licensed user is shown in accordance with at least one embodiment. The shown web service UI provides a sample report page: This is also a functional depiction of a possible test report page for a voice call made available to the licensed user, but other configurations may be made that add or remove illustrated components. The illustrated sample page includes information on the device (100), report information, observations, and a map of the area that was tested. In this sample the details of the logs associated with a particular location are shows. Another way to pivot the report may be based on time (vs. location).

Referring now to FIG. 14, a report page for a data call made available to the licensed user is shown in accordance with at least one embodiment. The illustrated web service UI shows a sample report page. This report is a functional depiction of a possible test report page for a data call made available to the licensed user. Other reports may include additional information and/or remove portions of the illustrated report. The sample page includes information on the device (100), report information, performance comparisons, observations, performance graphs and a map of the area that was tested. In this sample the details of the logs associated with a particular location are shows. Another way to pivot the report may be based on time (vs. location).

Figure 8:
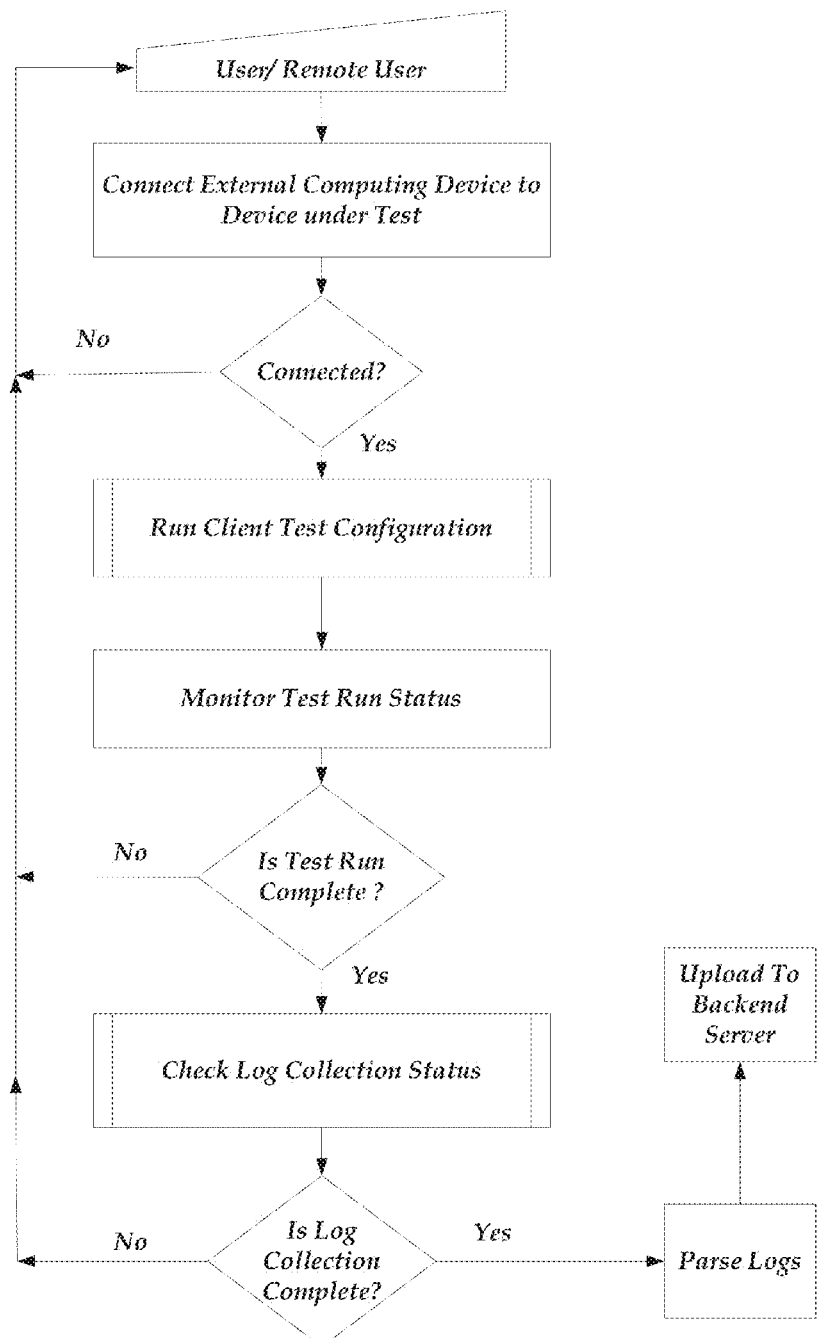
FIG. 8 illustrates a flow diagram view of a client application on an external computing device (such as a laptop or another wireless device) that interfaces with the device under test in accordance with various embodiments.

Referring now to FIG. 8, a flow diagram view of a client application on an external computing device (such as a laptop or another wireless device) that interfaces with the device under test is shown in accordance with various embodiments. In one embodiment, the client application is resident on an external computing device (such as a laptop or another wireless device) and interfaces with the device under test. This client is capable of configuring the test allowing for user input. This variable configuration file can be made available to a user at the site of testing or a remote user. The collected device logs are then transmitted to a remote database via a wired or wireless interface. The client application may also have a user interface that may convey the status of the test to the user and may also allow for certain remedial action (such as restarting the test).

Figure 19:
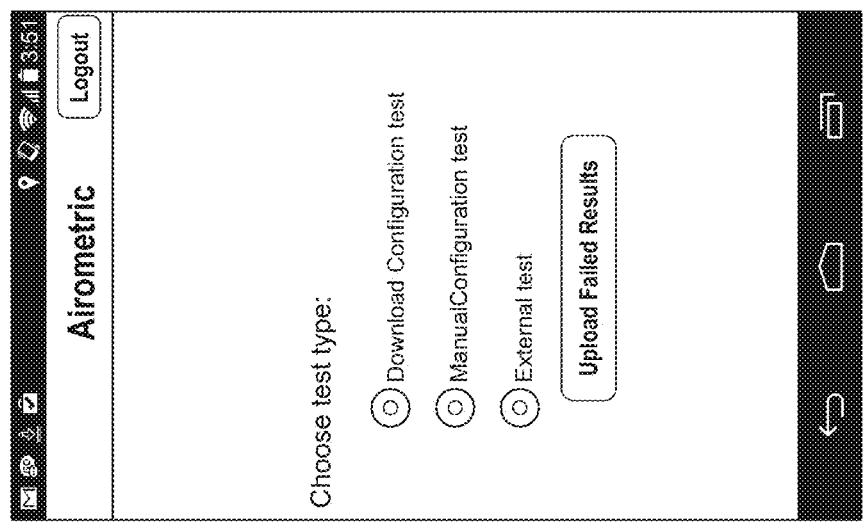
FIG. 19 illustrates a screenshot of a mobile device client landing page in accordance with various embodiments.
Figure 20:
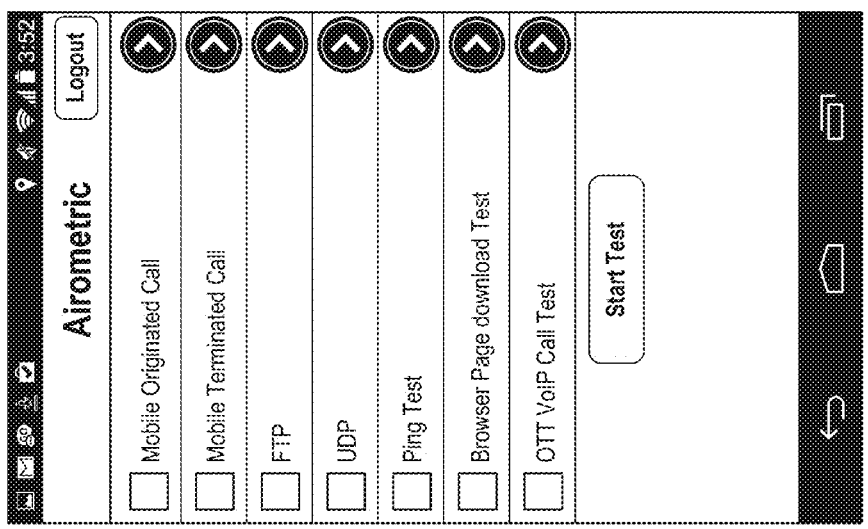
FIG. 20 illustrates a screen shot of a mobile device client for manual test configuration in accordance with various embodiments.
Figure 21:
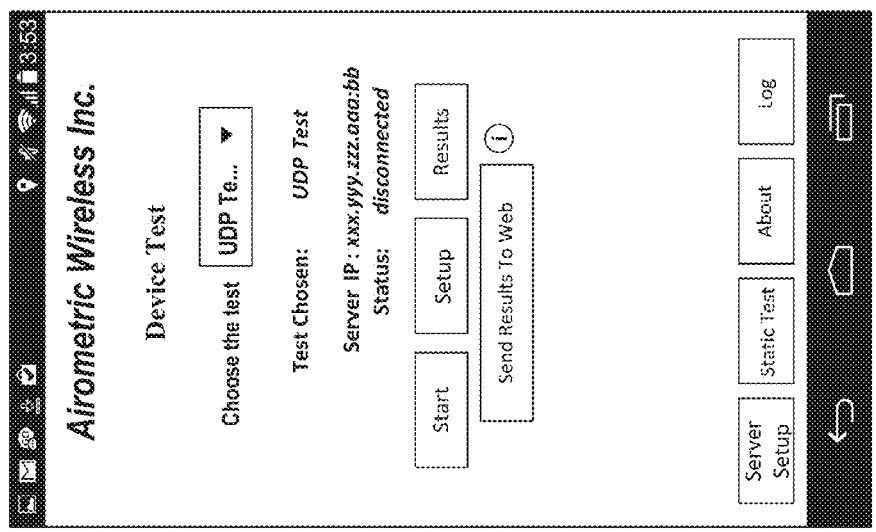
FIG. 21 illustrates a screen shot of a mobile device client for specific test configuration in accordance with various embodiments

Referring now to FIG. 23 illustrates the various key performance indicators rating indexes otherwise also referred to as the health index and sample formulae that is used to develop the indexes in accordance with various embodiments Referring now to FIGS. 19, 20, and 21, screenshots illustrate features and functionality for the on device client Interface is shown in accordance with various embodiments. More specifically FIG. 19 shows a screenshot of a mobile device client landing page in accordance with various embodiments. FIG. 20 depicts a screen shot of a mobile device client for manual test configuration in accordance with various embodiments. FIG. 21 shows a screen shot of a mobile device client for specific test configuration in accordance with various embodiments.

Additionally, although specific embodiments have been illustrated and described herein, it will be appreciated by those of ordinary skill in the art and others, that a wide variety of alternate and/or equivalent implementations may be substituted for the specific embodiments shown and described without departing from the scope of the embodiments described herein. This application is intended to cover any adaptations or variations of the embodiments discussed herein. While various embodiments have been illustrated and described, as noted above, many changes can be made without departing from the spirit and scope of the embodiments described herein.

The invention claimed is:

1. A computer-implemented method to determine the relative performance of a wireless device, network, or application in a collaborative environment, the method comprising:
    authenticating, by a secure exchange server hosted on a cloud, at least one user and at least one wireless device to be tested, a user login data authentication procedure allowing the at least one user to access the secure exchange server through at least one client computing device, and wherein each client computing device is a wireless device;
    testing, by a performance management system, relative performance of the at least one wireless device in a wireless environment, the at least one wireless device having a configurable device test client to create and to maintain logs including device specific contextual information;
    receiving, by a performance management system, packaged logs generated and uploaded by the at least one wireless device; and
    analyzing, by the performance management system, the relative performance of the at least one wireless device in the wireless environment.

2. The computer-implemented method of claim 1, wherein the testing further comprises collecting the logs even when the at least one wireless device is directly coupled to an external tool used to perform tests on the at least one device.

3. The computer-implemented method of claim 1, further comprising monitoring, by the performance management system, the relative performance of the at least one wireless device in the wireless environment.

4. The computer-implemented method of claim 1, wherein the device specific contextual information includes location, Radio Frequency environment, and device logs.

5. The computer-implemented method of claim 1, wherein the testing further comprises a single test or a combination of tests to create a routine that can be run for a desired length of time.

6. The computer-implemented method of claim 1, wherein the performance management system provides testing as a service (TAAS) of the wireless device or the network, or the application in the collaborative environment.

7. The computer-implemented method of claim 1, wherein the analyzing includes providing interactive maps designed to analyze and troubleshoot performance issues.

8. A computer-implemented method determines the relative performance of a wireless device, network, or application in a collaborative environment, the method comprising:
    testing, by a performance management system, relative performance of the at least one wireless device in a wireless environment, the at least one wireless device having a configurable device test client to create and to maintain logs including device specific contextual information;
    receiving, by a performance management system, packaged logs generated and uploaded by the at least one wireless device; and
    analyzing, by the performance management system, the relative performance of the at least one wireless device in the wireless environment, wherein the analyzing includes providing predictive analysis of a wireless product based on historical performance data for similar product offerings or groups of products, the historical performance data includes consumer experience data and context aware data to predict performance of the wireless product without an actual test data and logs.

9. One or more non-transitory computer readable medium having a plurality of instructions stored thereon which, when executed by one or more processors, cause the one or more processors to perform a method, the method comprising:
    authenticating, by a secure exchange server hosted on a cloud, at least one user and at least one wireless device to be tested, a user login data authentication procedure allowing the at least one user to access the secure exchange server through at least one client computing device, and wherein each client computing device is a wireless device;
    testing, by a performance management system, relative performance of the at least one wireless device in a wireless environment, the at least one wireless device having a configurable device test client to create and to maintain logs including device specific contextual information;
    receiving, by a performance management system, packaged logs generated and uploaded by the at least one wireless device; and
    analyzing, by the performance management system, the relative performance of the at least one wireless device in the wireless environment.

10. The one or more non-transitory computer readable medium of claim 9, wherein the testing further comprises collecting the logs even when the at least one wireless device is directly coupled to an external tool used to perform tests on the at least one device.

11. The one or more non-transitory computer readable medium of claim 9, wherein the testing further comprises a single test or a combination of tests to create a routine that can be run for a desired location.

12. The one or more non-transitory computer readable medium of claim 9, wherein the analyzing includes providing interactive graphs designed to analyze and troubleshoot performance issues.

13. The one or more non-transitory computer readable medium of claim 9, wherein the analyzing includes separating the performance behaviors of devices, networks, applications, or combinations of devices, networks or applications into distinctive groups and/or distinctive scenarios to identify and resolve performance issues.

14. A performance management system, comprising:
    one or more processors; and
    one or more non-transitory computer readable medium having a plurality of instructions stored thereon, which, when executed by the one or more processors, cause the system to perform a method, the method comprising:

testing, by a performance management system, relative performance of at least one wireless device in a wireless environment, the at least one wireless device having a configurable device test client to create and to maintain logs including device specific contextual information;

receiving, by a performance management system, packaged logs generated and uploaded by the at least one wireless device; and analyzing, by the performance management system, the relative performance of the at least one wireless device in the wireless environment, wherein the analyzing includes providing predictive analysis of a wireless product based on historical performance data for similar product offerings or groups of products, the historical performance data includes consumer experience data and context aware data to predict performance of the wireless product without actual test data and logs.

15. The performance management system of claim 14, wherein the testing further comprises collecting the logs even when the at least one wireless device is directly coupled to an external tool used to perform tests on the at least one device.

16. The performance management system of claim 14, wherein the testing further comprises a single test or a combination of tests to create a routine that can be run repeatedly for a desired length of time or for a desired location.

17. The performance management system of claim 14, wherein the analyzing includes providing performance information designed to analyze and troubleshoot performance issues, the performance information including interactive maps and graphs.

18. The performance management system of claim 14, wherein the performance management system includes a unique business logic server that caters to both device and network performance reporting, the business logic server exhibits flexibility to analyze past and present performance data of devices, networks, or applications.

19. The performance management system of claim 14, wherein the method includes determining component performance for the at least one wireless device relative to other wireless devices in common networks using the same component.

* * * * *